United States Patent
Amiri et al.

(10) Patent No.: US 12,063,054 B2
(45) Date of Patent: *Aug. 13, 2024

(54) WIRELESS DATA TRANSMISSION

(71) Applicant: MAXLINEAR, INC., Carlsbad, CA (US)

(72) Inventors: Bahador Amiri, Saratoga, CA (US);
Peiman Amini, Fremont, CA (US);
Simon Duxbury, Piedmont, CA (US);
Didier Margairaz, San Jose, CA (US);
Wing Kai Chong, San Ramon, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 690 days.

This patent is subject to a terminal disclaimer.

(21) Appl. No.: 17/124,137

(22) Filed: Dec. 16, 2020

(65) Prior Publication Data

US 2022/0014215 A1 Jan. 13, 2022

Related U.S. Application Data

(60) Provisional application No. 63/050,469, filed on Jul. 10, 2020.

(51) Int. Cl.
*H04W 40/00* (2009.01)
*H04B 1/00* (2006.01)
(Continued)

(52) U.S. Cl.
CPC ............. *H04B 1/0053* (2013.01); *H04B 1/18* (2013.01); *H04B 7/022* (2013.01); *H04B 7/0817* (2013.01);
(Continued)

(58) Field of Classification Search
CPC ......... H04B 1/18; H04B 7/002; H04W 40/00; H04W 40/06
(Continued)

(56) References Cited

U.S. PATENT DOCUMENTS 11,258,470 B2 * 2/2022 Duxbury .................. H04B 1/48
2017/0230972 A1 * 8/2017 Wang ..................... H04L 5/0053

OTHER PUBLICATIONS

Fabien Clermidy et al., "MIMO Evaluation Platform for Fast Hardware Baseband Reconfiguration of Advanced Wireless Networks", Future Network & MobileSummit 2010 Conference Proceedings, IIMC International Information Management Corporation, 2010, ISBN: 978-1-905824-18-2, 8 pages.
(Continued)

*Primary Examiner* — Dang T Ton
(74) *Attorney, Agent, or Firm* — Buchalter; Jason W. Croft

(57) ABSTRACT

An example method of wireless data transmission may include determining a configuration of multiple antenna element nodes. The configuration may indicate a frequency band of operation for each of the multiple antenna element nodes and the configuration may be determined based on one or more network factors of multiple frequency bands. The method may also include selecting, based on the configuration, a signal path to couple to each of the multiple antenna element nodes from multiple signal paths. The multiple signal paths may each be configured to amplify signals carried thereon and at least two of the multiple signal paths may be coupled between each antenna element node and a common node. The method may further include directing, based on the configuration, wireless communications over the multiple antenna element nodes.

20 Claims, 7 Drawing Sheets

(51) Int. Cl.
  *H04B 1/18*      (2006.01)
  *H04B 7/022*     (2017.01)
  *H04B 7/08*      (2006.01)
  *H04W 40/06*     (2009.01)
  *H04W 72/0453*   (2023.01)
  *H04W 84/12*     (2009.01)
  *H04W 84/18*     (2009.01)

(52) U.S. Cl.
  CPC ........... *H04W 40/00* (2013.01); *H04W 40/06* (2013.01); *H04W 72/0453* (2013.01); *H04W 84/12* (2013.01); *H04W 84/18* (2013.01)

(58) Field of Classification Search
  USPC .............................................. 370/329.4, 395
  See application file for complete search history.

(56) References Cited

OTHER PUBLICATIONS

Bjorn Mennenga et al., "A Component based Reconfigurable Baseband Architecture," Technische Universität Dresden, Dresden, Germany, Jan. 31, 2007, 5 pages.
Simon Duxbury et al., "Wireless Tranceiver," U.S. Appl. No. 16/918,574, filed Jul. 1, 2020, 41 pages.

* cited by examiner

WIRELESS DATA TRANSMISSION

CROSS-REFERENCE TO RELATED APPLICATION

This patent application claims priority to U.S. Provisional Patent Application No. 63/050,469, filed on Jul. 10, 2020, which is incorporated herein by reference in its entirety.

FIELD

The implementations discussed herein are related to wireless data transmission.

BACKGROUND

Unless otherwise indicated in the present disclosure, the materials described in the present disclosure are not prior art to the claims in the present application and are not admitted to be prior art by inclusion in this section.

Wireless local area networks (WLAN) may be established using a device called a Wireless Access Point (WAP). The WAP may wirelessly couple all of the devices of the local network, e.g. wireless stations such as digital devices to one another and to other networks. A WAP may operate on a communication band such as a 2.4 GHz or 5 GHz communication band.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

An example method of wireless data transmission may include determining a configuration of multiple antenna element nodes. The configuration may indicate a frequency band of operation for each of the multiple antenna element nodes and the configuration may be determined based on one or more network factors of multiple frequency bands. The method may also include selecting, based on the configuration, a signal path to couple to each of the multiple antenna element nodes from multiple signal paths. The multiple signal paths may each be configured to amplify signals carried thereon and at least two of the multiple signal paths may be coupled between each antenna element node and a common node. The method may further include directing, based on the configuration, wireless communications over the multiple antenna element nodes.

BRIEF DESCRIPTION OF THE DRAWINGS

Example implementations will be described and explained with additional specificity and detail through the use of the accompanying drawings in which.

DETAILED DESCRIPTION OF SOME EXAMPLE IMPLEMENTATIONS

Implementations described herein may generally relate to wireless data transmission.

In some implementations, wireless data transmission as described in this disclosure may be facilitated by a transceiver that may include multiple transmitter/receiver chains that are each configured to couple an antenna to baseband circuitry. Each of the transmitter/receiver chains and the antennas may be configured to handle signals from multiple different frequency bands, such as signals from the 2.4 GHz, the 5 GHz, and/or the 6 GHz frequency bands, among other frequency bands. As such, the wireless transceiver may be able to configure the multiple transmitter/receiver chains and antennas in any number of different configurations.

In some implementations, a configuration of the multiple transmitter/receiver chains and antennas may be determined based on one or more network factors of multiple frequency bands. The configuration may indicate a frequency band of operation from among the multiple frequency bands for each of the multiple transmitter/receiver chains and antennas. Wireless data may be transmitted and/or received over the frequency bands of operation using the multiple transmitter/receiver chains and antennas.

In some implementations, the network factors may include an availability of frequency channels in one or more of the multiple frequency bands, one or more devices, which obtain the wireless data being transmitted, being located within a structure, a type of communication traffic conveyed by the wireless data, network capabilities of the one or more devices, radio link budgets of the one or more devices, historical network traffic, current network traffic, and a number of devices communicating in each frequency band.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1:
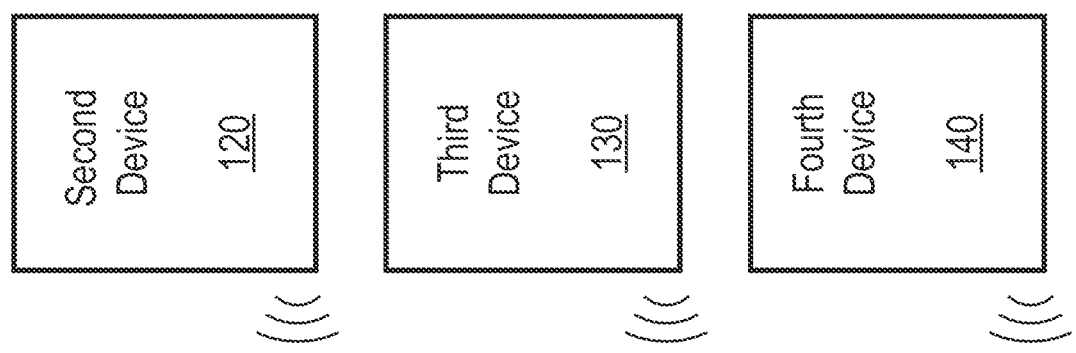
FIG. 1 illustrates an example environment that includes wireless data transmission.
Figure 1:
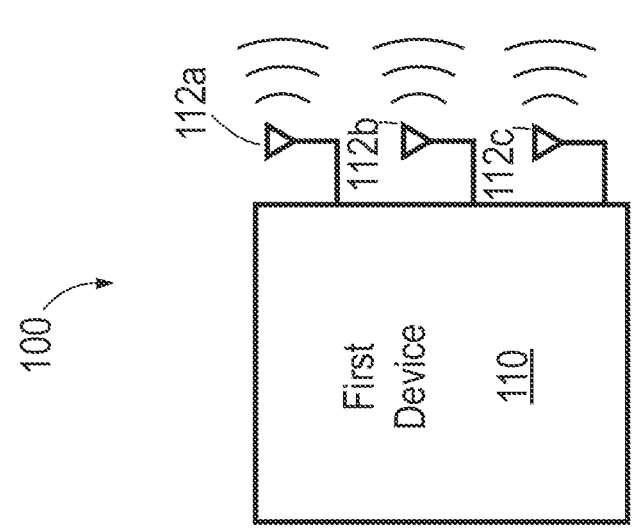

FIG. 1 illustrates an example environment 100 that includes wireless data transmission, in accordance with one or more implementations of the present disclosure. The environment 100 may include a first device 110, a second device 120, a third device 130, and a fourth device 140. The first device 110 may include a first antenna 112a, a second antenna 112b, and a third antenna 114c, referred to as the antennas 112. Each of the antennas may be coupled to a transmitter/receiver chain within the first device 110.

Each of the first device 110, the second device 120, the third device 130, and the fourth device 140 may be configured to transmit and receive wireless communications. In some implementations, each of the first device 110, the second device 120, the third device 130, and the fourth device 140 may be any electronic or digital device that is configured to transmit and receive wireless communications. In these and other implementations, the first device 110 may be configured as a device that may assist in maintaining a wireless local area network. For example, the first device 110 may include a gateway, a repeater, a mesh node, or any other suitable device configured to host or control access to a wireless local area network (WLAN).

In these and other implementations, each of the second device 120, the third device 130, and the fourth device 140 may be configured as a client device that may be configured to access a wireless local area network. For example, each of the second device 120, the third device 130, and the fourth device 140 may include a desktop computer, a laptop computer, a smartphone, a mobile phone, a tablet computer, a vehicle, a repeater, a speaker, a smart device, an appliance, or any other electronic device that may be configured to transmit and/or receive wireless communications in a wireless local area network.

The antennas 112 of the first device 110 may each be configured to operate in a frequency band of operation based on the transmitter/receiver chain coupled to each antenna 112. For example, the antennas 112 may be configured to operate in a first frequency band, a second frequency band, and/or a third frequency band. The first, second, and third frequency bands may each be different frequency bands of operations.

In some implementations, the first frequency band may be used for a first WLAN, the second frequency band may be used for a second WLAN that is different from the first WLAN, and the third frequency band may be used for a third WLAN that is different from the first WLAN and the second WLAN.

The first, second, and third WLANs may be implemented using any of the 802.11 protocols or other suitable wireless standards or protocols. In these and other implementations, the first, second, and third frequency bands may be distinct radio frequency ranges that are defined for wireless communications. In some implementations, at least one of the first, second, and third frequency bands may include a discontinuous range of frequencies. For example, the first, second, and third frequency bands may be selected from among frequency bands that include 900 MHz, 2.4 GHz, 3.6 GHz, 5.0 GHz, 6 GHz, 60 GHz, or other frequency bands. Note that a frequency band may extend in a range of frequencies. For example, the 5.0 GHz band may include frequencies between 5.150 GHz and 5.85 GHz. As another example, the 6.0 GHz band may include frequencies between 6.0 GHz and 6.9 GHz but may not include all of the frequencies between 6.0 GHz and 6.9 GHz. Rather, the 6.0 GHz band may include multiple grouping of frequencies where the groupings are discontinuous between 6.0 GHz and 6.9 GHz.

In some implementations, the frequencies within a frequency band may be defined by governmental bodies and/or protocols and thus may be different in different regions. Each of the frequency bands may include multiple frequency channels. In these and other implementations, frequency channels within a frequency band may include overlapping frequencies. However, the frequency bands discussed in this disclosure may not have overlapping frequencies or continuous frequencies. Rather, the frequency bands may include frequencies therebetween.

In some implementations, each of the antennas 112 may be configured to operate in a different frequency band and support a different WLAN. For example, the first antenna 112a may be configured to operate in the 5.0 GHz frequency band and support a first WLAN. The second antenna 112b may be configured to operate in the 6.0 GHz frequency band and support a second WLAN. The third antenna 112c may be configured to operate in the 2.4 GHz frequency band and support a third WLAN. Alternately or additionally, each of the antennas 112 may be configured to operate in the same frequency band and support the same WLAN. For example, each of the antennas 112 may be configured to operate in the 5.0 GHz frequency band and support a WLAN. Alternately or additionally, the antennas 112 may be configured to operate in any configuration of frequency bands. For example, two of the antennas 112 may operate in a first frequency band and a third one of the antennas 112 may operate in a second frequency band.

In some implementations, each of the antennas 112 may be configured to operate in a different frequency band of operation during overlapping time periods. For example, the first antenna 112a may operate in a first frequency band at the same time as the second antenna 112b may operate in a second frequency band. As a result, the first antenna 112a and the second antenna 112b may simultaneously transmit and/or receive wireless communications in the first and second frequency bands, respectively.

The frequency bands of operation of the antennas 112 may be referred to as a configuration of the antennas 112. In some implementations, based on the configuration of the antennas 112, the first device 110 may support one or more WLANs of different frequency bands that may be accessed by the second device 120, the third device 130, and/or the fourth device 140. In these and other implementations, each of the second device 120, the third device 130, and/or the fourth device 140 may be configured to receive data from the first device 110 over the one or more WLANs and transmit data to the first device 110 over the one or more WLANS. In these and other implementations, any protocol may be used to establish the WLANs to enable wireless communication over the antennas 112 between the first device 110 and the second device 120, the third device 130, and/or the fourth device 140. Note that the second device 120, the third device 130, and the fourth device 140 are examples of devices that may interact with WLANs established via the first device 110. More or less devices may interact with WLANs established via the first device 110.

Alternately or additionally, the second device 120, the third device 130, and the fourth device 140 may not be static such that the location and connectivity of the second device 120, the third device 130, and the fourth device 140 may change with time. For example, the fourth device 140 may disconnect from a first WLAN and later reconnect with a second WLAN.

In some implementations, the first device 110 may be configured such that the configuration of the antennas 112 may be changed. For example, the configuration of the antennas 112 may be not be static after manufacture of the first device 110. Rather, the first device 110 may be include hardware and/or software to allow the first device 110 to dynamical change the configuration of the antennas 112. As a result, in some implementations, a change in the configuration of the antennas 112 may result in the antennas 112 being configured to operate in an additional frequency. For example, the antennas 112 may be operating in a first frequency. In response to a change of the configuration of the antennas 112 so that the antennas 112 operate in the first frequency band and the second frequency band, one or more of the antennas 112 may be reconfigured to operate in the second frequency band.

As another example, a change in the configuration of the antennas 112 may result in the antennas 112 being configured to operate in fewer frequency bands such that a frequency band is removed from operation. For example, the antennas 112 may be operating in first and second frequency bands. In response to a change of the configuration of the antennas 112 so that the antennas 112 operate in only the first frequency band, the antennas 112 configured to operate in the second frequency band may be reconfigured to operate in the first frequency band.

As another example, a change in the configuration of the antennas 112 may result in a reallocation of the antennas 112 between bands of operation. For example, the first antenna 112a and the second antenna 112b may be operating in a first frequency band and the third antenna 112c may be operating in a second frequency band. In response to a determination to change the configuration of the antennas 112 to reallocate the antennas 112, the second antenna 112b may reconfigured to operate in the second frequency band.

In some implementations, the configuration of the antennas 112 may be determined based on one or more network factors of the frequency bands of operation that are supported by the first device 110. In these and other implementations, the network factors of the frequency bands of operation considered when determining the configuration of the antennas 112 may be based on the frequency bands of operation for which the antennas 112 are currently configured. Alternately or additionally, the network factors of the frequency bands of operation considered when determining the configuration of the antennas 112 may be based on all frequency bands of operation for which the antennas 112 may be configured. For example, the antennas 112 may be currently configured to operate in one frequency band but able to operate in three frequency bands. As such, the network factors of all three frequency bands may be considered when determining the configuration of the antennas 112.

In some implementations, the configuration of the antennas 112 may be determined based on the one or more network factors. For example, in response to a particular network factor, a configuration of the antennas 112 may change. Alternately or additionally, multiple of the network factors may be considered together to determine the configuration of the antennas 112. Alternately or additionally, one or more first network factors may be considered. In response to the first network factors satisfying a threshold and/or condition, other network factors may be considered to determine the configuration of the antennas 112. In these and other implementations, multiple tier of network factors may be considered before the configuration of the antennas 112 may be determined.

In some implementations, one or more rules may be applied using the network factors to determine the configuration of the antennas 112. Alternately or additionally, a machine learning module may be trained to determine the configuration of the antennas 112 based on the network factors. In these and other implementations, the machine learning module may obtain the network factors and output a configuration of the antennas 112.

The network factors that may be considered for each of the frequency bands of operation may include frequency band data, traffic data, device data, environment data, and historical data, among other types of data. In some implementations, the frequency band data may include information regarding the frequency band, such as availability of channels within the frequency band, potential data rates of the frequency band, ranges of the frequency band, and power requirements of the frequency band, among other information regarding the frequency bands.

In some implementations, the traffic data may include information regarding the type of network traffic that is being communicated and/or request to be communicated over the WLAN supported by the first device 110. For example, the network traffic may be an audio stream, video stream, internet traffic, data downloads, data uploads, gaming traffic, and communication network traffic, among other types of network traffic. Each of the types of network traffic may include different network data requirements, such as low latency data requirements, that may be used to determine a configuration of the antennas 112.

In some implementations, the device data may include information regarding the first device 110 and the client devices of the first device 110. The information regarding the devices may include the current frequency bands of operation of the devices, capability of the devices to operate in different frequency bands, bandwidth capability, capabilities of the devices to operate in multiple frequency bands simultaneously, such as multi-link capability, locations of the devices, transmit power capability of the devices, mobility of the devices, receive power sensitivity of the devices, receive power levels of the devices at particular transmit power levels, multiple-input multiple-output (MIMO) capability of the devices, and beamforming capability of the devices, among other aspects of the devices.

In some implementations, the environment data may include information regarding an environment that includes the first device 110 and the client devices. For example, the information may include interferes in the environment; building density of the environment, such as residential, rural, high-rise, compact, spare, etc.; and other wireless networks in the environment; among other types of information.

In some implementations, the historical data may include historical information regarding previous configuration of the antennas 112, historical information regarding access of WLANs by the devices, historical information regarding a type of data transmission over the WLANS, historical information regarding the network connection of the devices with the WLANs, and historical information regarding other network factors, among other information.

In some implementations, the historical data may include historical information regarding previous configuration of the antennas 112, historical information regarding access of WLANs by the devices, historical information regarding a type of data transmission over the WLANS, historical information regarding the network connection of the devices with the WLANs, and historical information regarding other network factors, among other information.

In some implementations, a configuration of the antennas 112 may be determined based on network factors in response to a change in a WLAN operating in a frequency band supported by the antennas 112. A change in a WLAN operating in a frequency band supported by the antennas 112 may include a client device joining or leaving the WLAN, a change in a type of data being communicated over the WLAN, a position of a device within the WLAN changing, a change in an environment of the WLAN, introduction of other WLANs within an environment of the WLAN, and introduction of other devices that may support the WLAN such as repeaters, mesh points, or other devices that may support client devices accessing the WLAN, among other types of changes to the WLAN.

Alternately or additionally, a configuration of the antennas 112 may be determined based on network factors at particular time intervals. In these and other implementations, the particular time intervals may be random, periodic, partially random, or sequential, among other types of time intervals. Alternately or additionally, the particular time intervals may be selected or adjusted based on one or more factors of WLAN operating in frequency bands supported by the antennas 112. For example, a change to a WLAN operating in a frequency band supported by the antennas 112 may result in a time interval being adjusted or a different time interval being selected.

Alternately or additionally, a configuration of the antennas 112 may be determined based on network factors in response to a status change of the first device 110. For example, a change in power supply for first device 110 may be a status change of the first device 110. As another example, the first device 110 rebooting, powering on, or otherwise accepting a change in parameters of the first device 110 may result in a status change of the first device 110.

In some implementations, the configuration of the antennas 112 may be determined by the first device 110. In these and other implementations, the first device 110 may collect information from client devices, such as the second device 120, the third device 130, and the fourth device 140 regarding one or more network factors. Based on the collected network factors and/or other network factors, the first device 110 may determine a configuration of the antennas 112.

Alternately or additionally, the configuration of the antennas 112 may be determined by another device. The determined configuration may be provided to the first device 110 to allow the first device 110 to configure the antennas 112 based on the configuration. For example, in some implementations, one of the client devices, such as the second device 120 may determine the configuration based on network factors obtained by the second device 120. As another example, a device not associated with the environment 100 may determine the configuration. For example, a processor in a remote system, such as a cloud computing system, may be configured to obtain the network factors. In these and other implementations, the network factors may include information from the first device 110 and client devices of the first device 110. The network factors may also include information regarding other access point devices that may be proximate to the environment 100. In these and other implementations, the remote system may determine the configuration of the antennas 112 based on the environment 100 and other environments that include other WLANs hosted by other devices.

In some implementations, the first device 110 may be configured to alert client devices in response to a change in the configuration of the antennas 112. For example, the first device 110 may use an action frame of the WLAN and/or beacons to notify client devices regarding the reallocation of the antennas 112 within a frequency band.

As another example, in response to a configuration of the antennas 112 that adjusts a channel of operation within a frequency band, the first device 110 may use a channel switch announcement to indicate to the client devices regarding the change in the channel of operations.

As another example, in response to a configuration of the antennas 112 that adjusts a number of frequency bands supported by the antennas 112, such as adding or removing a channel, the first device 110 may use base station transition management techniques to move client devices from a first frequency band to a second frequency band.

As another example, first device 110 may be configured to use an action frame to move one or more client devices from a first frequency band to a second frequency band. In these and other implementations, to move multiple client device from one frequency band to a second frequency band, the client devices may be notified through a beacon or multicast packet that indicates to the client devices of the move between frequency bands and thus move between WLANs.

For example, the beacon may include media access control (MAC) addresses of the client devices or other identifiers that indicates to the client devices that the message pertains to the client devices.

In some implementations, to assist with potential hardware failures, client devices may be provided with an indication of the move between frequency bands before a request is made for the client device to move between frequency bands. Alternately or additionally, client devices may be directed to move to a particular frequency band that is not part of the current or next configuration of the antennas 112 during a reconfiguration of the antennas 112 to the next configuration. After the reconfiguration of the antennas 112, the client devices may be directed to a frequency band of the current configuration of the antennas 112.

Modifications, additions, or omissions may be made to the environment 100 without departing from the scope of the present disclosure. For example, the environment 100 may include any number of other elements or may be implemented within other systems or contexts than those described. For example, the first device 110 may include addition antenna. Alternately or additionally, the first device 110 may be configured for two, four, five, six, seven, or more frequency bands. In these and other implementations, the antennas 112 may be configured for the number of frequency bands as described above.

As another example, the first device 110 may be part of a mesh network of multiple mesh points configured to host a WLAN. In these and other implementations, the devices of the mesh network may be configured based on a determined configuration.

Figure 2:
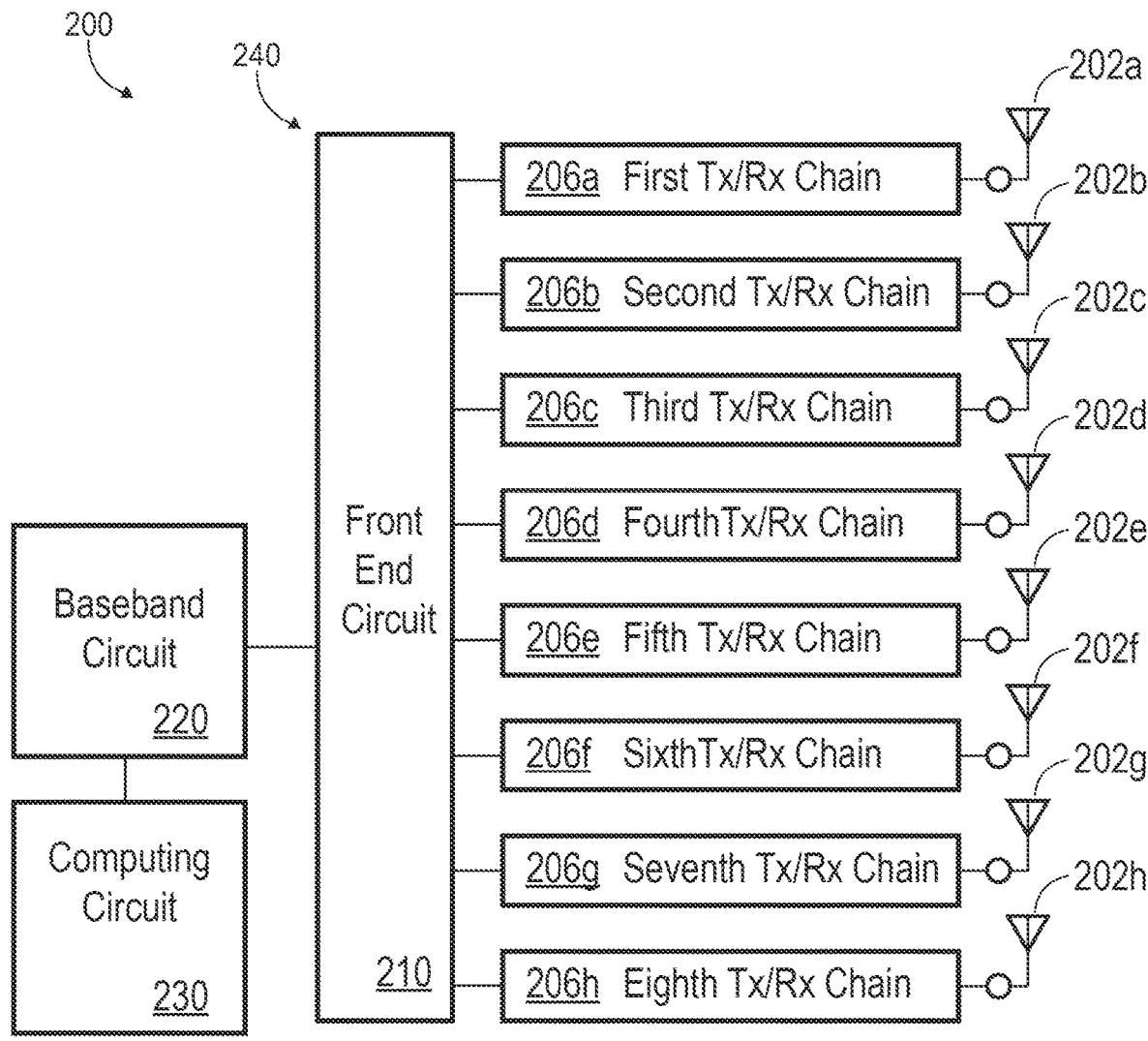
FIG. 2 illustrates an example device configured for wireless data transmission.

FIG. 2 illustrates an example device 200 configured for wireless data transmission, in accordance with one or more implementations of the present disclosure. The device 200 may be an example implementation of the first device 110 of FIG. 1. As such, a configuration of antennas elements 202 of the device 200 may be changed as described in this disclosure.

The device 200 may include a wireless transceiver 240. The wireless transceiver 240 may include first, second, third, fourth, fifth, sixth, seventh, and eighth transmit/receive chains 206a-206h, referred to collectively as the transmit/receive chains 206, a front-end circuit 210, and a baseband circuit 220. The device 200 may additionally include a computing circuit 230 and a first, second, third, fourth, fifth, sixth, seventh, and eighth antenna elements 202a-202h, referred to collectively as the antenna elements 202. As illustrated, each of the transmit/receive chains 206 may be coupled to one of the antenna elements 202. The computing circuit 230 may be coupled to the baseband circuit 220.

The wireless transceiver 240 may be configured to support any number of frequency bands. In these and other implementations, the transmit/receive chains 206 may include signal paths for the supported frequency bands. The front-end circuit 210 may include a conversion circuit configured for the supported frequency bands by converting frequencies of wireless signals between a baseband frequency and frequencies of supported frequency bands. The front-end circuit 210 may further include additional circuitry that may be configured to further condition transmit and receive signals for the supported frequency bands, such as filters, amplifiers, and other circuitry.

The baseband circuit 220 may be configured to construct the transmit signals transmitted by the antenna elements 202. The baseband circuit 220 may also be configured to process receive signals obtained by the antenna elements 202.

The computing circuit 230 may be configured to provide data to the baseband circuit 220 for transmission and process data received by the computing circuit 230. For example, the computing circuit 230 may include computer-readable instructions that when executed follow the protocols of the one or more WLAN in which the device 200 operates. An example of the computing circuit 230 may include the processor 2050, memory 2052, and data storage 2054 of FIG. 7.

In some implementations, the device 200 may operate in any number of configurations based on the number of frequency bands supported by the wireless transceiver 240 and the antenna elements 202. For example, when the device 200 supports two frequency bands, the device 200 may be configured as two synchronous radios for different WLANs that may support any number of different MIMO configurations for the different WLANs. For example, the configurations may include 0x8, 1x7, 2x6, 3x5, and 4x4 type configurations among other permutations where the first number represents the number of antenna elements 202 configured for a first frequency band and the second number represents the number of antenna elements 202 configured for a second frequency band.

As another example, for three frequency bands, the configurations may include 0x0x8, 0x2x6, 0x4x4, 5x2x1, 5x3x0, 0x5x3, 1x3x4, 2x2x4, 4x2x2, 6x2x0, 8x0x0, among the other permutations possible where the first number represents the number of antenna elements 202 configured for a first frequency band, the second number represents the number of antenna elements 202 configured for a second frequency band, and the third number represents the number of antenna elements 202 configured for a third frequency band.

In some implementations, the computing circuit 230 may be configured to determine the configuration of the antenna elements 202. In these and other implementations, the computing circuit 230 may also be configured to select and direct the change of the configuration of the antenna elements 202 based on the determined configuration. To change the configuration, switching elements within the transmit/receive chains 206 and conversion signals applied by the front-end circuit 210 may be changed among other changes to the device 200.

Modifications, additions, or omissions may be made to the device 200 without departing from the scope of the present disclosure. For example, the wireless transceiver 240 may include more or less than eight transmit/receive chains 206 and antenna elements 202, such as a 4, 6, 10, 12, 16, 32, or 64 transmit/receive chains, among other number of transmit/receive chains and antenna elements.

Figure 3:
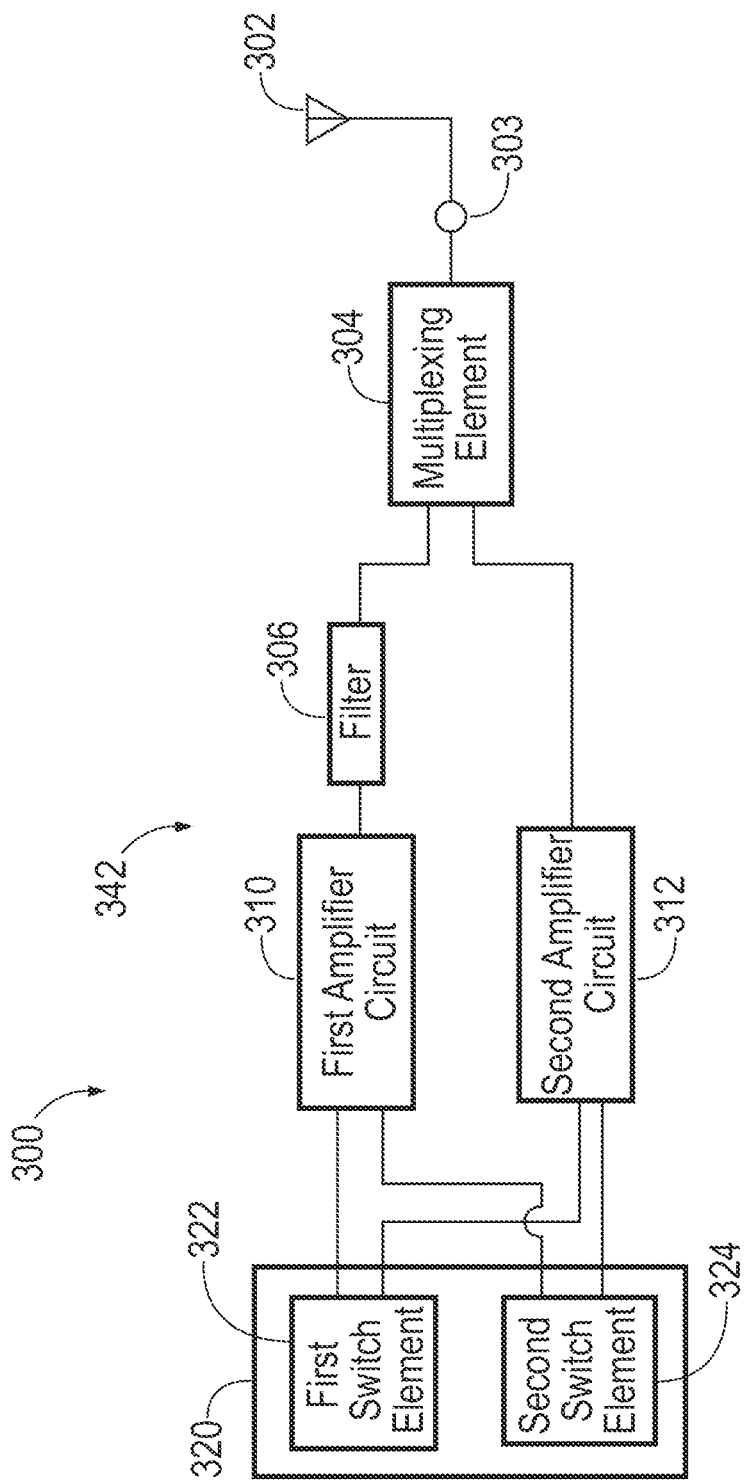
FIG. 3 illustrates an example device that includes a transmit/receive chain.

FIG. 3 illustrates an example device 300 that includes a transmit/receive chain 342, in accordance with one or more implementations of the present disclosure. The transmit/receive chain 342 may be an example of the transmit/receive chains 206 of FIG. 2. The transmit/receive chain 342 may be configured to operate in a first frequency band and a second frequency band that is different than the first frequency band. The transmit/receive chain 342 may be coupled between a conversion circuit 330 and an antenna element 302. The antenna element 302 may be configured to transmit and receive wireless signals transmitted over the first and second frequency bands.

During operation in the first frequency band and in the second frequency band, the transmit/receive chain 342 may be configured to carry transmit signals to the antenna element 302 over the transmit/receive chain 342 and to carry receive signals from the antenna element 302 over the transmit/receive chain 342.

In some implementations, the transmit/receive chain 342 may include an antenna node 303, a multiplexing element 304, a filter 306, a first amplifier circuit 310, a second amplifier circuit 312, and a switch unit 320 that may include a first switch element 322 and a second switch element 324.

The antenna node 303 may be an electrical node that is configured to pass electrical signals, such as transmit and receive signals between the transmit/receive chain 300 and the antenna element 302. The multiplexing element 304 may be configured to multiplex transmit signals in the first frequency band and transmit signals in the second frequency band onto a single signal path to the antenna element 302 through the antenna node 303. The multiplexing element 304 may be further configured to direct receive signals in the first frequency band and receive signals in the second frequency band received on the antenna node 303 into different signal paths. As an example, the multiplexing element 304 may include a diplexer circuit that includes filters configured for the first and second frequency bands.

The filter 306 may be configured to pass frequencies in the first frequency band and filter out frequencies in second frequency band. The filter 306 may be configured to pass a filtered receive signal in the first frequency band to the first amplifier circuit 310. The filter 306 may also be configured to filter transmit signals and pass the filtered transmit signals in the first frequency band to the multiplexing element 304.

The first amplifier circuit 310 may be configured to amplify receive signals in the first frequency band obtained from the filter 306. The first amplifier circuit 310 may be further configured to amplify transmit signals in the first frequency band obtained from the first switch element 322.

The second amplifier circuit 312 may be configured to amplify receive signals in the second frequency band obtained from the multiplexing element 304. The second amplifier circuit 312 may be further configured to amplify transmit signals in the second frequency band obtained from the first switch element 322.

The switch unit 320 may be configured to select between signal paths for the first frequency band and signal paths for the second frequency band within the transmit/receive chain 342 for transmit and receive signals. In these and other implementations, the first switch element 322 may be configured to pass transmit signals and the second switch element 324 may be configured to pass receive signals.

For example, the first switch element 322 may be configured to selectively couple the conversion circuit 330 to the antenna element 302 by way of a first transmit signal path for the first frequency band that traverses the first amplifier circuit 310, the filter 306, and a first port of the multiplexing element 304 or by way of a second transmit signal path for the second frequency band that traverses the second amplifier circuit 312 and a second port of the multiplexing element 304.

The second switch element 324 may be configured to selectively couple the antenna element 302 to the conversion circuit 330 by way of a first receive signal path for the first frequency band that traverses the first amplifier circuit 310, the filter 306, and the first port of the multiplexing element 304 or by way of a second receive signal path for the second frequency band that traverses the second amplifier circuit 312 and the second port of the multiplexing element 304.

The conversion circuit 330 may be configured to convert the frequencies of signals between a baseband frequency and the first and second frequency bands.

The device 300 as described includes amplification of transmit and receive signals in signal paths between the switch unit 320 and the multiplexing element 304. Amplification of the transmit and receive signal in unique signals between the switch unit 320 and the multiplexing element 304 may reduce a noise figure for receive signals in the device 300 and may reduce insertion loss for transmit signals in the device 300.

Modifications, additions, or omissions may be made to the device 300 without departing from the scope of the present disclosure. For example, the device 300 may include any number of other elements or may be implemented within other systems or contexts than those described. As another example, the first amplifier circuit 310 and the second amplifier circuit 312 are illustrated as separate. However, in some implementations, the elements in the first amplifier circuit 310 and the second amplifier circuit 312, such as one or more amplifiers, may be shared between the first amplifier circuit 310 and the second amplifier circuit 312.

As another example, the device 300 may be configured for more than two frequency bands. For example, the device 300 may be configured for three, four, five, six, seven, or more frequency bands. In these and other implementations, the device 300 may include additional paths between the switch unit 320 and the antenna node 303. Further details regarding implementation of a device for which a configuration of the antennas may be changed as described in this disclosure is found in U.S. patent application Ser. No. 16/918,574, filed on Jul. 1, 2020, the entirety of which is incorporated herein.

Figure 4:
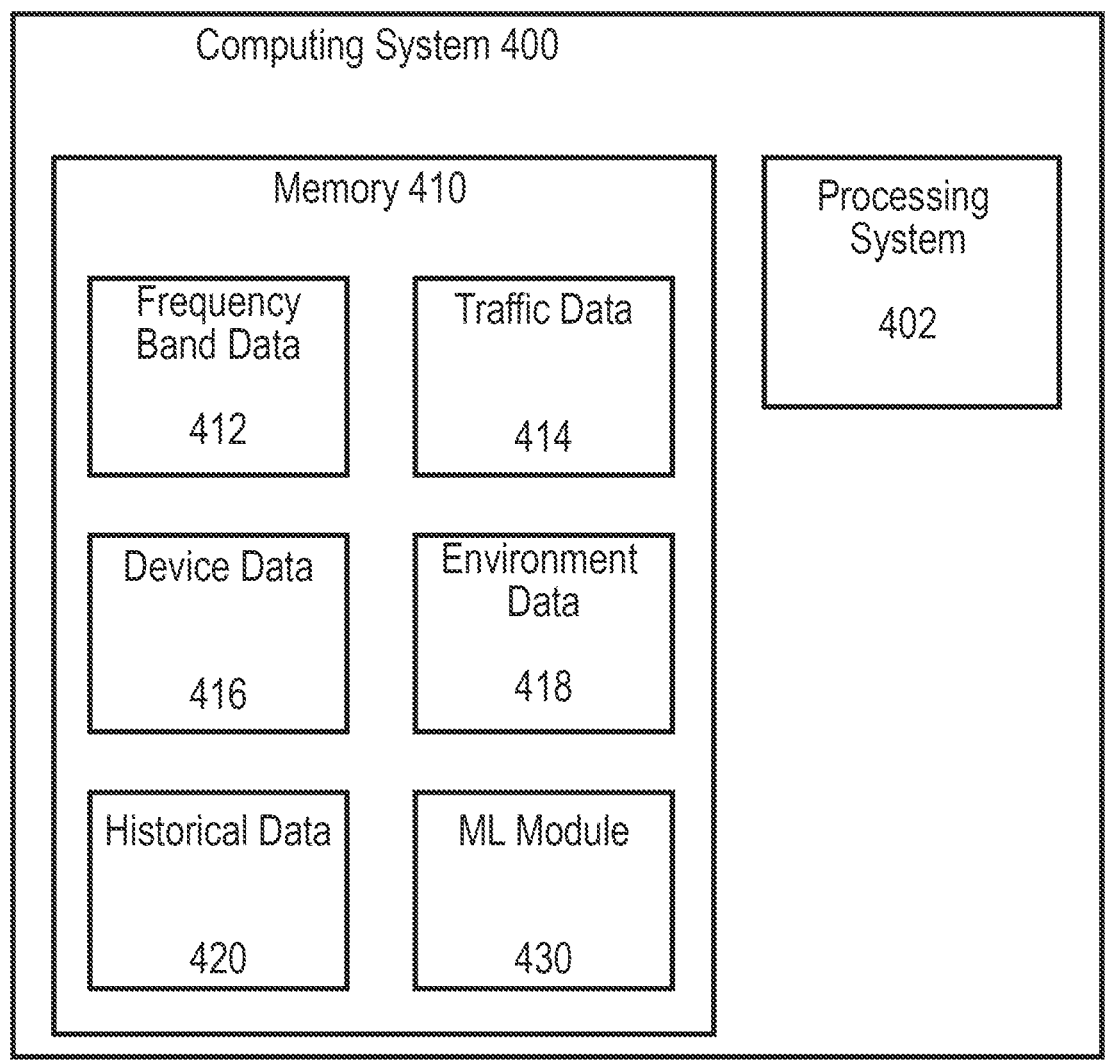
FIG. 4 illustrates an example computing system.

FIG. 4 illustrates an example computing system 400 in accordance with one or more implementations of the present disclosure. The computing system 400 may include a processing system 402 and a memory 410.

The computing system 400 may be configured to determine a configuration of hardware of a device to allow the device to operate in one or more frequency bands for wireless communication. For example, the configuration of hardware may be a configuration of antennas, antenna nodes, transmit/receive chains, among other types of hardware that may be used for wireless communication. The different configurations of hardware may allow the device to better utilize one or more frequency bands based on geographic, environmental, and/or application specific configurations, among other types of configurations. In some implementations, the configuration of hardware may be adaptive during operation such that a device may change the configuration of hardware while supporting WLANs to better utilize the one or more frequency bands based on geographic, environmental, and/or application specific configurations, among other types of configurations.

As an example, the computing system 400 may be part of the first device 110, the second device 120, the third device 130, fourth device 140, or a cloud computing system, among other types of devices. The computing system 400 may determine a configuration of hardware based on network factors. The memory 410 may include data regarding various types of network factors. For example, the memory 410 may include frequency band data 412, traffic data 414, device data 416, environment data 418, and historical data 420. In some implementations, the computing system 400 may use a machine learning module 430 to determine the configuration of hardware based on the data. For example, the computing system 400 may provide the data to the machine learning module 430. The machine learning module 430 may be trained to select a configuration of hardware based on the data. In these and other implementations, the machine learning module 430 may output a configuration of hardware that may be used.

In some implementations, the frequency band data 412 may include information regarding one or more frequency bands for which the hardware is configured to support WLANs. For example, for each of the frequency bands the hardware is configured to support, the frequency band data 412 may include availability of channels within the frequency band, potential data rates of the frequency band, ranges of the frequency band, and power requirements of the frequency band, among other information regarding the frequency bands.

In some implementations, one or more of the frequency bands may be implemented with frequency control. For example, the frequency control may determine operation in particular frequency channels within the frequency band when operation exceeds a particular transmission power level and/or a client device being support is operated in a particular environment, such as outside a building. The frequency control may be implemented by a governmental agency, business, or other organization. In these and other implementations, a device may operate in a particular frequency channel without restrictions in response to registering operation with a database. In these and other implementations, the computing system 400 may check the database to obtain information regarding the frequency channels and may adhere to changes to allocation of frequency channels as indicated in the database.

For example, the computing system 400 may be registered to operate in a frequency channel of a first frequency band. After registration, the database may be updated to indicate that the authorization to operate in an additional frequency channel. In response, the configuration may allocate one or more additional antennas for a higher order MIMO in the first frequency band. After changing the configuration, the database may be updated to indicate that the authorization to operate in the frequency channels is revoked. In response to the revocation, the computing system 400 may search for another frequency channel for operation in the first frequency band. In response to no other channels being available in the first frequency band, the computing system 400 may change the configuration of the hardware to no longer support the first frequency band. For example, the configuration may allocate the antennas operating in the first frequency band to a second frequency band. As such, a client device utilizing a WLAN in the first frequency band may utilize a WLAN in the second frequency band. In a similar manner, the computing system 400 may change the configuration to support the first frequency band in response to being able to register for operation in the first frequency channel. In these and other implementations, the determination whether to change the configuration to support the first frequency band may be based on other network factors.

As another example, a configuration may support operation in the first frequency band based on the client device operating in a particular environment, such as indoors, and at a power level less than a particular power level. In response to the client device moving outside the particular environment and/or a transmission power level being higher than the particular power level to maintain a desired radio link budget and not being able to register for a frequency channel, the computing system 400 may determine a configuration that does not include the first frequency band. In these and other implementations, the configuration may include implementing more antennas in a second frequency band to enable a MIMO configuration with multiple antenna in the second frequency band to support a desired data rate for the client device.

In some implementations, the traffic data 414 may include information regarding the type of network traffic that is being communicated and/or request to be communicated over a WLAN. For example, the network traffic may be an audio stream, video stream, internet traffic, data downloads, data uploads, gaming traffic, and communication network traffic, among other types of network traffic. In these and other implementations, the network traffic may be determined by an inspection of a packet of data being communicated over a wireless network. Inspecting the packet of data may results in detecting an application, which may indicate a type of the network traffic.

In some implementations, each of the types of network traffic may include different network data requirements, such as low or high latency data requirements, high or low throughput requirements, among other requirements, that may be used to determine a configuration of the antennas 112. For example, based on a low latency and/or high throughput requirements of network traffic for a client device, a configuration of the hardware may change to support a first frequency band with lower latency and/or higher throughput than a second frequency band. In these and other implementations, the configuration of the hardware may be maintained until the end of the network traffic that benefits from the first frequency band.

In some implementations, the device data 416 may include information regarding the devices connected to or supporting one or more WLANs. For example, the devices may be access points and client devices. In some implementations, the device data 416 may include an indication of the client devices wireless connected to an access point and a number of client devices wireless connected to an access point in each of multiple different frequency bands.

The device data 416 may also include current frequency bands of operation of the devices, capability to operate in different frequency bands, bandwidth capability, capability to operate in multiple frequency bands simultaneously (multi-link capability), locations of the devices, mobility of the devices, transmit power capability of the devices, receive power sensitivity of the devices, receive power levels of the devices at particular transmit power levels, radio link budgets device, multiple-input multiple-output (MIMO) capability of the devices, and beamforming capability of the devices, among other aspects of the devices.

Data regarding a current frequency band of operation may indicate in which frequency band a device is currently operating. For example, an access point may include a hardware configuration that supports two frequency bands at a particular MIMO configuration of the two frequency bands. Data regarding a current frequency band of operation may indicate how many client devices are operating in each frequency band.

Data regarding capability to operate in different frequency bands may indicate a number of client devices capable to operate in a different frequency band than the client devices are operating in as compared to a total number of client devices being served by an access point.

Data regarding a location of a device may indicate a relative location between two devices, such as a location between a client device and an access point. Alternately or additionally, data regarding a location of a device may indicate if the device is located within a particular environment, such as within a building or outside of a building.

Data regarding transmit power capability may relate to transmit power in each of multiple frequency bands. Data regarding receive power sensitivity may relate to transmit power in each of multiple frequency bands. Data regarding receive power levels at particular transmit power levels may be obtained for each of multiple frequency bands. In these and other implementations, the receive power levels at particular transmit power levels data may include received signal strength indicator (RSSI) data. In some implementations, a client device may provide the receive power levels for a first frequency band. In these and other implementations, an estimate of the receive power level at a second frequency band may be estimated based on the receive power levels for the first frequency band. Alternately or additionally, receive power levels may be estimated using one or more beacon measurement reports. Alternately or additionally, an access point may transmit data to a client device at a particular frequency band to obtain an indication of a receive power level at the particular frequency band.

In some implementations, the environment data 418 may include information regarding an environment that includes the devices wireless communicating. For example, the environment data 418 may include interference in the environment. In these and other implementations, the interference may be for frequency bands and/or individual channels within frequency bands. In these and other implementations, an access point may gather the data or request a client device to provide interference data on different frequency bands and/or different channels.

The environment data 418 may also include interferes in the environment, including other devices in the environment; building density of the environment, such as residential, rural, high-rise, compact, spare, etc.; and other wireless networks in the environment; a number of access points or mesh points operating in an environment, among other types of information. For example, the computing system 400 may be part of a cloud computing system or another system that is obtaining network factors from multiple different access points or mesh points. The access points or mesh points may be located such that the access points or mesh points may interfere with each other. In these and other implementations, the computing system 400 may select a configuration for each of the access points or mesh points based on the network factors for each of the access points or mesh points. For example, based on client device capabilities and locations, traffic data for client devices, and/or interference in a first frequency band in one or more access points or mesh points, it may be determined that the one or more access points or mesh points are more suited to operate in a second frequency band. Thus, the configuration of the one or more access points or mesh points may include the second frequency band and the configuration of other access points or mesh points may not include the second frequency band. As another example, the computing system 400 may determine MIMO orders for different access points or mesh networks based on the network factors of multiple access points or mesh networks.

As another example, the computing system 400 may include a mesh point of multiple mesh points or another device associated with the multiple mesh points. In these and other embodiments, the computing system 400 may select a configuration for each of the mesh points to communicate with each other and/or other access points based on a number of mesh points being larger than a threshold, a network traffic between the mesh points being larger than a threshold, and/or a type of network traffic between the mesh points being a particular type of network traffic. For example, the configuration for each of the mesh points may include the mesh point communicating therebetween and/or with other access points on a first frequency band and communicating with client devices on second and/or third frequency bands. For example, the first frequency band may be a 6 GHz frequency band and the second and third frequency bands may be 2.4 and 5 GHz frequency bands.

In some implementations, the historical data 420 may include historical information regarding previous configurations, historical information regarding access of WLANs by the devices, historical information regarding a type of data transmission over the WLANS, historical information regarding the network connection of the devices with the WLANs, and historical information regarding other network factors, among other information.

In some implementations, the historical data 420 may be used to determine a configuration of hardware alone without consideration of other network factors. For example, at a particular time on a particular day of the week, a configuration may be determined. After the same or similar configuration is determined at the particular time and day a threshold number of times, the configuration may be used for the particular time and day before other network factors suggest the configuration based on historically changing to the configuration.

Figure 5:
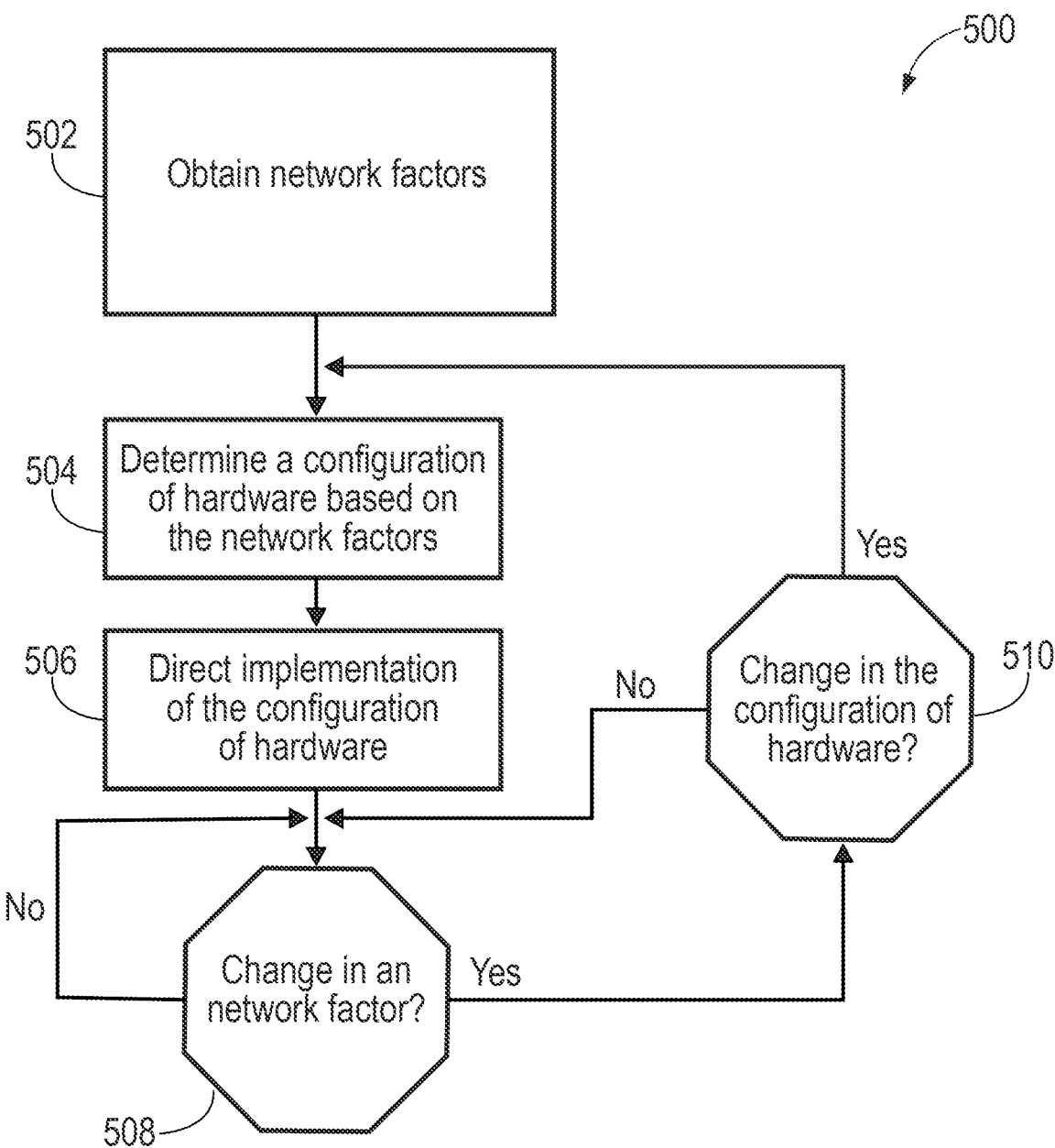
FIG. 5 illustrates a flowchart of an example method of wireless data transmission.

FIG. 5 illustrates a flowchart of an example method 500 of wireless data transmission, in accordance with one or more implementations of the present disclosure. The method 500 may be implemented, in whole or in part, by one or more of the devices/systems 110, 200, or 400, of FIGS. 1, 2, and 4.

At block 502, a device and/or system may obtain network factors. The network factors may be obtained by a device or system that may be configured to determine a configuration of hardware for one or more access points or mesh networks. The network factors may include network factors from client devices and/or the access points or mesh networks for which the configuration may be determined.

At block 504, the device and/or system may determine a configuration of hardware based on the network factors. In some implementations, the device and/or system may be an access point, mesh network, cloud computing system, client device, or some other device.

In some implementations, all or some of the network factors may be used to determine the configuration. In some implementations, a decision to add a frequency band to a configuration may be based on a number of client devices, which satisfy requirements for the frequency band, satisfying a threshold. The requirement for a frequency band may include an ability to operate in the frequency band, such as including a hardware configured for operation in the frequency band, a channel being available for the frequency band, a location of the client device being located within a structure, the client device being a mobile or a stationary device, the client device including a radio link budget for the frequency band that satisfies a threshold, and a power requirement for transmitting to the client device satisfying a threshold. The frequency channel being available may be based on a frequency control of the channel. The threshold for the power requirement may be based on the frequency control for the frequency band. The threshold for the radio link budget may be based on the client device and/or data transmission requirements.

The threshold for the number of client devices may be based on device data, environmental data, historical data, and/or traffic data. For example, traffic data of one or more of the devices may include low latency and high throughput requirements. Based on the frequency band being configured for higher data throughput, the threshold for the number of devices may be lower to reduce data traffic on other frequency bands.

As another example, historical data may indicate that other devices are likely to join the WLAN that satisfy the requirement for the frequency band. As such, the threshold for a number of client devices on the WLAN may be less because a configuration that includes the frequency band would likely be used in the future.

As another example, environmental data may indicate interference in other frequency bands higher than a threshold. To reduce the number of client devices in the other frequency bands and thereby avoid the interference, the threshold for the number of devices may be lower.

Alternately or additionally, a decision to add a frequency band to a configuration may be based on any of the above network factors individually or any combination of the above network factors.

In some implementations, a decision to remove a frequency band from a configuration may be based on a number of client devices, which satisfy requirements for the frequency band, satisfying a threshold. Similar analysis as discussed above with respect to adding a frequency band may apply to removing a frequency band.

In some implementations, a decision to reallocate the antennas associated with two or more frequency bands may be based on a number of client devices in each of the frequency bands satisfying threshold. For example, a configuration may reallocate the antennas based on a difference, between a number of client devices in a first frequency band and a number of client devices in a second frequency band, satisfying a threshold. The threshold may be based on environmental data, historical data, and/or traffic data similar to other thresholds discussed in this disclosure.

At block 506, the device and/or system may direct implementation of the configuration of hardware at the access points or mesh networks. In these and other implementations, directing implementation of the configuration hardware may include transmitting the configuration of hardware to the access points or mesh networks. Alternately or additionally, directing the implementation of the configuration of hardware may include providing instructions for the access points or mesh networks to implement the configuration of hardware.

At block 508, the device and/or system may determine if there is a change in one or more of the network factors. In response to the change, the method 500 may proceed to block 510. In response to no change, the method 500 may continue at block 508 to determine if there is a change in one or more of the network factors. In some implementations, the device and/or system may determine a change in one or more of the network factors at a particular time interval, in response to a network event, such as a device joining or leaving a WLAN, or based on monitoring network factors.

At block 510, the device and/or system may determine if the change in the one or more network factors may result in a change in the configuration of the hardware. In response to a change in the configuration of the hardware, the method 500 may proceed to block 504 where the configuration of the hardware may be determined. In response to no change in the configuration of the hardware, the method 500 may proceed to block 508.

In some implementations, at block 510 the device and/or system may be configured to determine if the change in the one or more network factors may result in a change in the configuration of the hardware based on comparing a cost of changing the configuration of the network to the benefit of changing the configuration of the network. For example, an access point may be servicing five client devices on a WLAN of a first frequency band. A sixth client device may join the WLAN and be capable of operating in a second frequency band. None of the other client devices may be capable of operating on the second frequency band. As a result, the costs to allocate one or more antenna to service a single client device may reduce the ability to service the remaining client device more than the ability to service the sixth client device. As a such, the configuration may not be changed.

As another example, the access point may be servicing five client devices on a WLAN of a first frequency band. A sixth client device may join the WLAN and be capable of operating in the second frequency band. Two of the other client devices may be capable of operating on the second frequency band. As a result, allocating one or more antenna to service the three client devices may increase the ability to service the remaining client device based on reduced interference in each frequency band. Based on all of the client devices benefiting from the three client devices moving to the second frequency band, the configuration may be changed.

Figure 6:
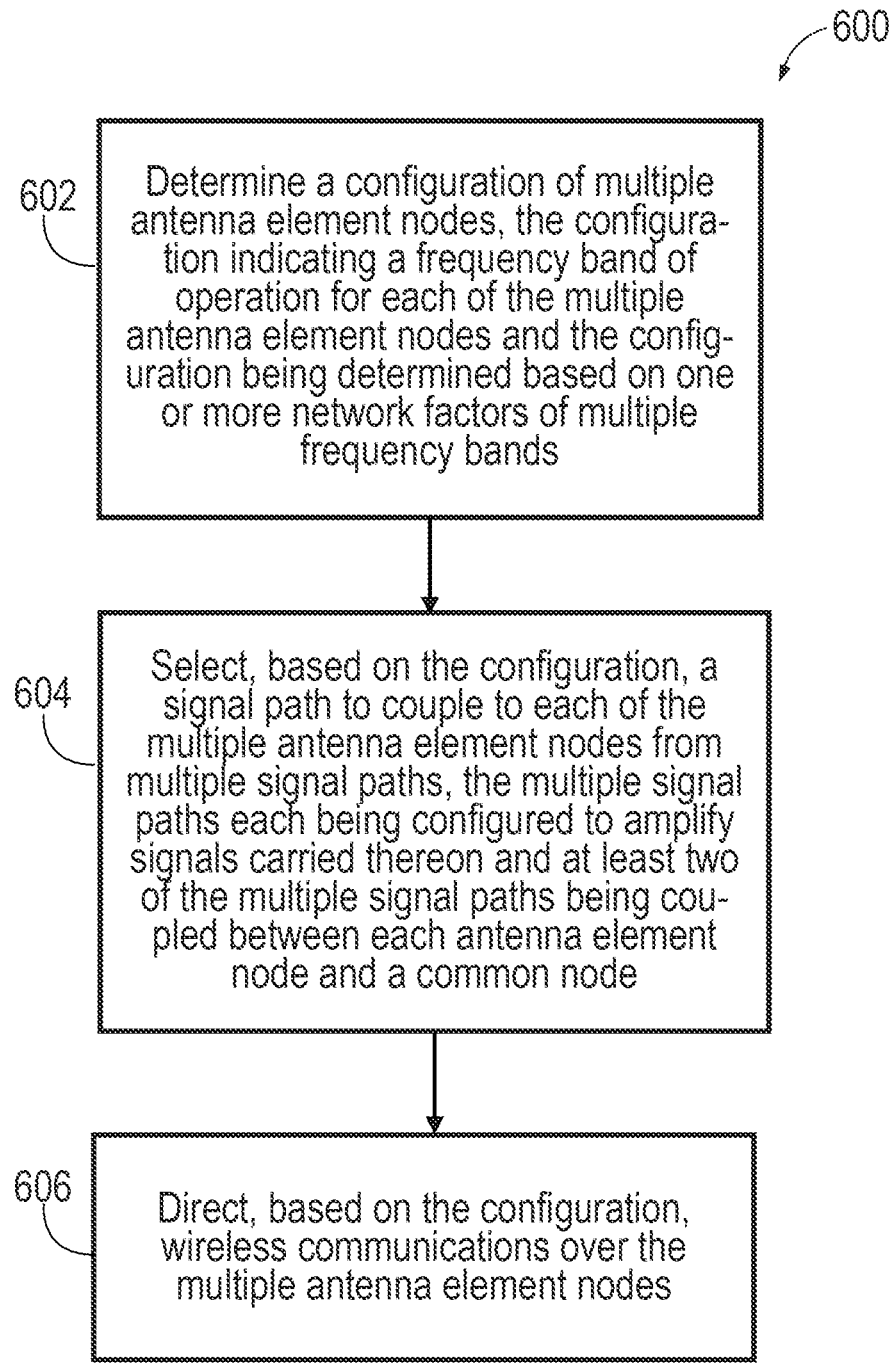
FIG. 6 illustrates a flowchart of another example method of wireless data transmission.

FIG. 6 illustrates a flowchart of an example method 600 of wireless data transmission, in accordance with one or more implementations of the present disclosure. The method 600 may be implemented, in whole or in part, by one or more of the devices/systems 110, 200, or 400, of FIGS. 1, 2, and 4.

At block 602, a configuration of multiple antenna element nodes may be determined. The configuration may indicate a frequency band of operation for each of the multiple antenna element nodes. In some implementations, the configuration may be determined based on one or more network factors of multiple frequency bands.

In some implementations, each of the multiple frequency bands may be distinct frequency bands and at least one of the multiple frequency bands may include a discontinuous range of frequencies. In these and other implementations, the multiple frequency bands may be defined under the 802.11 protocol and include a 5 GHz band and a 6 GHz band.

In some implementations, the configuration may be determined in response to one or more of: a change to a wireless network operating in one of the multiple frequency bands, a status change of a device that includes the multiple antenna element nodes, and a particular time interval.

In some implementations, the one or more network factors may include one or more of: availability of frequency channels in one or more of the multiple frequency bands, one or more devices obtaining the wireless communications being located within a structure, and a type of communication traffic conveyed by the wireless communications. Alternately or additionally, the one or more network factors may include one or more of: network capabilities of the one or more devices, radio link budgets of the one or more devices, historical network traffic, current network traffic, and a number of devices communicating in each of the multiple frequency band.

At block 604, a signal path to couple to each of the multiple antenna element nodes from multiple signal paths may be selected based on the configuration. In some implementations, the multiple signal paths may each being configured to amplify signals carried thereon and at least two of the multiple signal paths may be coupled between each antenna element node and a common node.

At block 606, wireless communications may be directed based on the configuration over the multiple antenna element nodes. In some implementations, the wireless communications may be directed over at least two of the multiple frequency bands during overlapping time periods.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

For example, the method 600 may further include when determining the configuration of the multiple antenna element nodes, the configuration of the multiple antenna element nodes may be changed based on the one or more network factors to: include an additional frequency band, remove a frequency band, and/or reallocate a number of the multiple antenna element nodes associated with two or more of the multiple frequency bands. In these and other implementations, the configuration of the multiple antenna element nodes may change to include additional frequency bands in response to a change in a type of communication traffic conveyed by the wireless communications for a device obtaining the wireless communications.

Various example implementations of the systems, devices, and/or methods described in this disclosure are now provided.

For example, an access point may be configured to support two WLANS, a first WLAN in first frequency band and a second WLAN in a second frequency band. There may be ten client devices accessing the first and second WLANs. Two of the client devices may be operating in the second frequency band and configured to operate in a third frequency band. Additionally, the two client devices may be positioned such that they are located within a structure and have a RSSI larger than a threshold indicating that the two client devices would be able to operate in the third frequency band in their current locations. Another client device may join the second WLAN and be configured to operate in the third frequency band. Additionally, the other client device may be located within a structure and have a RSSI larger than a threshold indicating that the other client device may be able to operate in the third frequency band in its current locations. In response to a number of client devices that are able to operate on the third frequency band being larger than a threshold, a configuration of the access point may be determined to include the third frequency band and the hardware of the access point may be adjusted so that the access point may support a third WLAN in the third frequency band while maintaining the first and second WLANS. The access point may direct the two client devices and the other client device to move to the third WLAN. After a period of time, the other client device may leave the third WLAN and not re-associate after a particular time period. As a result, the number of devices to maintain the third WLAN may not satisfy a threshold, where the threshold is based on a number of devices on the second WLAN that are not able to connect to the third WLAN compared to a number of devices on the second WLAN that are able to connect to the third WLAN. In response, the configuration of the access point may change to not support the third frequency band and the two client devices on the third frequency band may be moved to the second WLAN.

As another example, one client device may be operating in the second frequency band and configured to operate in a third frequency band. Additionally, the client device may be positioned such that it is located within a structure and have a RSSI larger than a threshold indicating that the client device would be able to operate in the third frequency band in its current locations. The client device may start an application with high-priority low-latency wireless data requirements that may be better supported by the third frequency band than by the first and second frequency bands. In response to the new traffic data, the configuration of the access point may be determined to include the third frequency and the hardware of the access point may be adjusted so that the access point may support a third WLAN in the third frequency band. The access point may direct the client device to move to the third WLAN while continuing to support the first and second WLAN. Other client devices may move to the third WLAN as well. After a period of time, the application may terminate. In response to a number of devices to maintain the third WLAN not satisfying a threshold, the configuration of the access point may change to not support the third frequency band and the client devices on the third frequency band may be moved to the second WLAN.

As another example, the access point may obtain an indication that a channel in a third frequency band is available at a higher transmission power level. As a result of the higher transmission power levels, a number of the client devices supported by the access point that are configured to operate in the third frequency band may now include link budgets that are appropriate for communication over the third frequency band. As such, a number of client devices that may operate on the third frequency band may be larger than a threshold. In response, a configuration of the access point may be determined to include the third frequency band and the hardware of the access point may be adjusted so that the access point may support a third WLAN in the third frequency band while maintaining the first and second WLANS. The access point may direct the client devices to move to the third WLAN. After a period, the access point may obtain an indication that no channels in the third frequency band is available at the higher transmission power level. As a result, link budgets of one or more of the client devices operating in the third frequency band may not be appropriate for communication over the third frequency band. As a result, the number of devices to maintain the third WLAN may not satisfy a threshold. In response, the configuration of the access point may change to not support the third frequency band and the client devices on the third frequency band may be moved to the second WLAN. The antennas configured for the third frequency band may be configured to support the second frequency to achieve a higher order MIMO in the second frequency band.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 may include a device including multiple antenna element nodes configured to pass wireless communications over multiple frequency bands. The device may also include a processing unit configured to: determine a configuration of the multiple antenna element nodes. The configuration may indicate a frequency band of operation for each of the multiple antenna element nodes and the configuration may be determined based on one or more network factors of the multiple frequency bands. The processing unit may be further configured to direct, based on the configuration, the wireless communications over the multiple antenna element nodes. The device may also include a switch unit configured to couple each of the multiple antenna element nodes to a different one of multiple signal paths between the switch unit and the multiple antenna element nodes. The multiple antenna element nodes may be configured to amplify signals carried thereon and at least two of the multiple signal paths are coupled between each antenna element node and the switch unit.

Example 2 may include a method of wireless data transmission. The method may include determining a first configuration of multiple antenna element nodes. The first configuration may indicate a frequency band of operation for each of the multiple antenna element nodes and the first configuration may be determined based on one or more network factors of multiple frequency bands. The method may also include obtaining an indication of a change in one of the one or more network factors and determining, based on the change, a second configuration of the multiple antenna element nodes that reallocates a number of the multiple antenna element nodes associated with a first frequency band to a second frequency band. The method may further include selecting, based on the second configuration, a signal path to couple to each of the multiple antenna element nodes from multiple signal paths. The multiple signal paths may each be configured to amplify signals carried thereon and at least two of the multiple signal paths may be coupled between each antenna element node and a common node. The method may further include directing, based on the second configuration, wireless communications over the multiple antenna element nodes.

Example 3 may include the method described with respect to FIG. 6. For example the method may include determining a configuration of multiple antenna element nodes. The configuration may indicate a frequency band of operation for each of the multiple antenna element nodes and the configuration may be determined based on one or more network factors of multiple frequency bands. The method may also include selecting, based on the configuration, a signal path to couple to each of the multiple antenna element nodes from multiple signal paths. The multiple signal paths may each be configured to amplify signals carried thereon and at least two of the multiple signal paths may be coupled between each antenna element node and a common node. The method may further include directing, based on the configuration, wireless communications over the multiple antenna element nodes.

Figure 7:
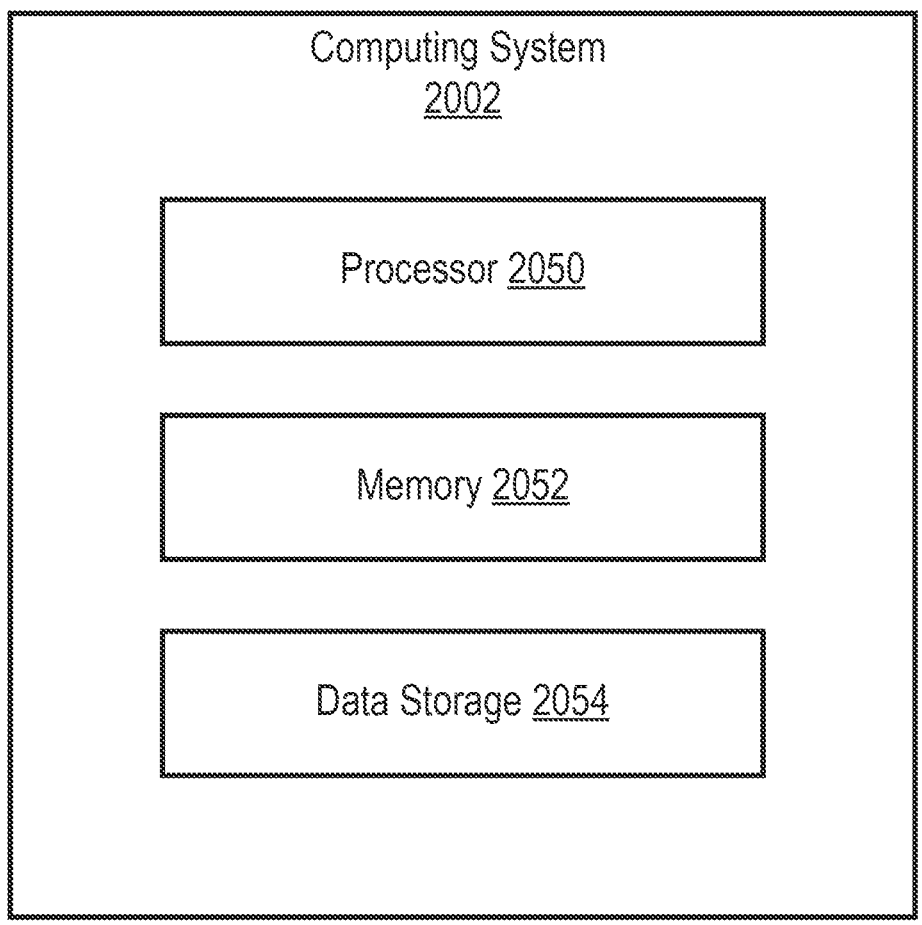
FIG. 7 illustrates a block diagram of an example computing system that may be used to perform or direct performance of one or more operations described according to at least one implementation of the present disclosure.

FIG. 7 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured SPU operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of wireless data transmission, the method comprising:
    determining a configuration of a plurality of antenna element nodes, the configuration indicating a frequency band of operation for each of the plurality of antenna element nodes and the configuration being determined based on one or more network factors of a plurality of frequency bands;
    selecting, based on the configuration, a signal path to couple to each of the plurality of antenna element nodes from a plurality of signal paths, the plurality of signal paths each being configured to amplify signals carried thereon and at least two of the plurality of signal paths being coupled between each antenna element node and a common node; and
    directing, based on the configuration, wireless communications over the plurality of antenna element nodes.

2. The method of claim 1, wherein each of the plurality of frequency bands are distinct frequency bands and at least one of the plurality of frequency bands includes a discontinuous range of frequencies.

3. The method of claim 2, wherein the plurality of frequency bands are defined under the 802.11 protocol and include a 2.4 GHz band, a 5 GHz band, and a 6 GHz band.

4. The method of claim 1, wherein the configuration is determined in response to one or more of: a change to a wireless network operating in one of the plurality of frequency bands, a status change of a device that includes the plurality of antenna element nodes, and a particular time interval.

5. The method of claim 1, wherein the one or more network factors include one or more of: availability of frequency channels in one or more of the plurality of frequency bands based on information from a database, one or more devices obtaining the wireless communications being located within a structure, a number of mesh points operating on one or more of the plurality of frequency bands, and a type of communication traffic conveyed by the wireless communications.

6. The method of claim 5, wherein the one or more network factors further include one or more of: network capabilities of the one or more devices, radio link budgets of the one or more devices, historical network traffic, current network traffic, and a number of devices communicating in each of the plurality of frequency band.

7. The method of claim 1, wherein determining the configuration of the plurality of antenna element nodes includes changing the configuration of the plurality of antenna element nodes based on the one or more network factors to: include an additional frequency band, remove a frequency band, and/or reallocate a number of the plurality of antenna element nodes associated with two or more of the plurality of frequency bands.

8. The method of claim 7, wherein the configuration of the plurality of antenna element nodes changes to include additional frequency bands in response to low latency communication traffic being conveyed by the wireless communications for a device obtaining the wireless communications.

9. The method of claim 1, wherein the wireless communications are directed over at least two of the plurality of frequency bands during overlapping time periods.

10. A method of wireless data transmission, the method comprising:
   determining a first configuration of a plurality of antenna element nodes, the first configuration indicating a frequency band of operation for each of the plurality of antenna element nodes and the first configuration being determined based on one or more network factors of a plurality of frequency bands;
   obtaining an indication of a change in one of the one or more network factors;
   determining, based on the change, a second configuration of the plurality of antenna element nodes that reallocates a number of the plurality of antenna element nodes associated with a first frequency band to a second frequency band;
   selecting, based on the second configuration, a signal path to couple to each of the plurality of antenna element nodes from a plurality of signal paths, the plurality of signal paths each being configured to amplify signals carried thereon and at least two of the plurality of signal paths being coupled between each antenna element node and a common node; and
   directing, based on the second configuration, wireless communications over the plurality of antenna element nodes.

11. The method of claim 10, wherein reallocating the number of the plurality of antenna element nodes associated with the first frequency band to the second frequency band results in the second configuration including an additional frequency band or removing a frequency band as compared to the first configuration.

12. The method of claim 10, wherein each of the plurality of frequency bands are distinct frequency bands and at least one of the plurality of frequency bands includes a discontinuous range of frequencies.

13. The method of claim 10, wherein the determination of the second configuration is based on one or more of: network capabilities of other devices, radio link budgets of the other devices, historical network traffic, current network traffic, and a number of the other devices communicating in each frequency channel.

14. The method of claim 10, wherein the determination of the second configuration is based on one or more of: availability of frequency channels in one or more of the plurality of frequency bands based on information from a database, one or more devices obtaining the wireless communications being located within a structure, a number of mesh points operating on one or more of the plurality of frequency bands, and low latency communication traffic conveyed by the wireless communications.

15. The method of claim 10, wherein the wireless communications are directed over at least two of the plurality of frequency bands during overlapping time periods.

16. A device comprising:
   a plurality of antenna element nodes configured to pass wireless communications over a plurality of frequency bands;
   a processing unit configured to:
      determine a configuration of the plurality of antenna element nodes, the configuration indicating a frequency band of operation for each of the plurality of antenna element nodes and the configuration being determined based on one or more network factors of the plurality of frequency bands; and
      direct, based on the configuration, the wireless communications over the plurality of antenna element nodes; and
   a switch unit configured to couple each of the plurality of antenna element nodes to a different one of a plurality of signal paths between the switch unit and the plurality of antenna element nodes, the plurality of antenna element nodes being configured to amplify signals carried thereon and at least two of the plurality of signal paths are coupled between each antenna element node and the switch unit.

17. The device of claim 16, wherein each of the plurality of frequency bands are distinct frequency bands and at least one of the plurality of frequency bands includes a discontinuous range of frequencies.

18. The device of claim 16, wherein the one or more network factors include one or more of: availability of frequency channels in one or more of the plurality of frequency bands based on information from a database, one or more devices obtaining the wireless communications being located within a structure, a number of mesh points operating on one or more of the plurality of frequency bands, and low latency communication traffic conveyed by the wireless communications.

19. The device of claim 16, determining the configuration of the plurality of antenna element nodes includes changing the configuration of the plurality of antenna element nodes based on the one or more network factors to: include an additional frequency band, remove a frequency band, and/or reallocate a number of the plurality of antenna element nodes associated with two or more of the plurality of frequency bands.

20. The device of claim 16, wherein the configuration is determined in response to one or more of: a change in a wireless network operating in one of the plurality of frequency bands, a status change of the device, and a particular time interval.

* * * * *